United States Patent [19]
Whiteside et al.

[11] 4,147,418
[45] Apr. 3, 1979

[54] PHOTOGRAPHIC EXPOSURE CONTROL SYSTEM WITH INDEPENDENT AMBIENT AND ARTIFICIAL ILLUMINATION CONTROL MODES

[75] Inventors: George D. Whiteside, Lexington; Irving Laskin, Sharon, both of Mass.

[73] Assignee: Polaroid Corporation, Cambridge, Mass.

[21] Appl. No.: 841,192

[22] Filed: Oct. 11, 1977

[51] Int. Cl.² .............................................. G03B 7/16
[52] U.S. Cl. ...................................... 354/27; 354/29; 354/59
[58] Field of Search ....................... 354/26, 27, 29, 42, 354/49, 59

[56] References Cited

U.S. PATENT DOCUMENTS

| | | | |
|---|---|---|---|
| 3,532,046 | 10/1970 | Wienchol | 95/55 |
| 3,972,057 | 7/1976 | Whiteside | 354/29 |
| 4,047,190 | 9/1977 | Johnson et al. | 354/27 |
| 4,058,817 | 11/1977 | Johnson et al. | 354/59 |

*Primary Examiner*—Russell E. Adams
*Attorney, Agent, or Firm*—Edward S. Roman

[57] ABSTRACT

An exposure control system of the type embodying scanning type shutter blades includes two separate sets of photocell sweep secondary apertures in the shutter blades together with a single photoresponsive element wherein each set of secondary apertures may be controlled independently of the other set to admit scene light to the photoresponsive element in correspondence with the scene light admitted to the film plane during either an ambient or artificially scene lighted mode of operation.

10 Claims, 9 Drawing Figures

PHOTOGRAPHIC EXPOSURE CONTROL SYSTEM WITH INDEPENDENT AMBIENT AND ARTIFICIAL ILLUMINATION CONTROL MODES

BACKGROUND OF THE INVENTION

1. Field of the Invention

This invention relates generally to a photographic exposure control system having independent ambient and artificial scene illumination control modes, and more particularly to a photographic exposure control system embodying scanning type shutter blades having two separate sets of photocell sweep secondary apertures, each set of which controls the admittance of scene light to a photoresponsive element in correspondence with the scene light admitted to the film plane during either an ambient or artificially scene lighted mode of operation.

2. Description of the Prior Art

Recently, cameras embodying "scanning type" shutter blade arrangements have been used in conjunction with fixed focus objective lenses to provide a camera which is simple to operate. One camera of this type is currently marketed by the Polaroid Corporation under the trade name "One Step". This camera utilizes film units of the self-processable type which are automatically processed and ejected from the camera by way of a motorized drive mechanism. Thus, the photographer need only depress a single button to effect both the exposure and processing of the film units.

One exposure control system which is particularly suited for use in such cameras is described in a copending Application Ser. No. 801,477 entitled "Scanning Shutter Blade Arrangement With Ambient And Flash Ranges" by B. K. Johnson et al. filed May 31, 1977 in common assignment herewith and discloses a means by which the scene light admitted to a photoresponsive element may be controlled in a different manner for the natural or ambient scene lighted mode of operation than for the artificial scene lighted mode of operation. This is accomplished by providing the scanning shutter blade elements with photocell sweep secondary apertures to control the admittance of scene light to the photoresponsive element in correspondence with the admittance of scene light to the film plane in a manner as is already known in the art. In the natural or ambient scene lighted mode of operation, the exposure control limits the size to which the effective primary aperture and the effective photocell sweep secondary aperture can progressively open to a first range. During the artificial scene lighted mode of operation, the source of artificial illumination is fired at a point in time coinciding with the shutter blade elements reaching their maximum effective aperture defining positions within the first range. Subsequent to firing the flash, the shutter blade elements continue to open to define a second range of progressively increasing sized apertures beyond the first range of the ambient scene lighted mode of operation. Thus, the photocell sweep secondary apertures may be further configured to control the scene light admitted to the photoresponsive element in its second range of progressively increasing sized apertures in a manner which is especially suited for the artificially scene lighted mode of operation.

Although the photocell sweep secondary apertures may be configured to provide effective control in either the ambient scene lighted mode of operation through its first range of progressively increasing sized apertures or in the artificially scene lighted mode of operation through its second range of increasing sized apertures, there will be incurred a slight loss in the depth of field for the artificially scene lighted mode of operation since the second range of effective apertures are larger than the first range of effective apertures utilized during the ambient scene lighted mode of operation.

Thus, it is a primary object of this invention to provide a photographic exposure control system wherein the exposure may be controlled independently in either the ambient scene lighted mode of operation or the artificial scene lighted mode of operation without changing the range of effective apertures utilized between modes of operation.

It is also an object of this invention to provide a photographic exposure control system wherein the artificial scene lighted mode of operation may be controlled in a manner different from the ambient scene lighted mode of operation while still using only a single photocell and without changing the depth of field between the two modes of operation.

Other objects of the invention will be part be obvious and will in part appear hereinafter. The invention accordingly comprises the mechanism and system possessing the construction, combination of elements and arrangement of parts which are exemplified in the following detailed disclosure.

SUMMARY OF THE INVENTION

A photographic camera apparatus is provided for use in either an ambient scene lighted mode or an artificially scene lighted mode and includes means for mounting photographic film material at a given focal plane. The camera comprises a blade mechanism together with means for mounting the blade mechanism for displacement between a first arrangement wherein it precludes scene light from reaching the film plane and a second arrangement wherein it defines a maximum size aperture. The blade mechanism serves to define a first range of progressively increasing sized apertures for admitting scene light to the film plane as it moves from its first arrangement to its second arrangement.

Selectively actuable means are cooperatively associated with the blade mechanism and the mounting means for alternately detecting scene light during the ambient scene lighted mode in a manner maintaining a first select corresponding relationship between the detected scene light and the scene light admitted to the focal plane by the blade mechanism as it moves through the range of apertures between the first and second arrangements, and for detecting scene light in the artificially scene lighted mode in a manner maintaining a second select corresponding relationship between the detected scene light and the scene light admitted to the focal plane by the blade mechanism as it moves through the range of apertures between the first and second arrangements. Means are provided for integrating the detected scene light to provide an output signal corresponding to a select exposure value. Selectively actuable drive means are additionally provided for initially displacing the blade mechanism from its first arrangement towards its second arrangement and for thereafter displacing the blade mechanism back towards its first arrangement in response to the output signal from the scene light integrating means to define an exposure cycle.

DESCRIPTION OF THE DRAWINGS

The novel features that are considered characteristic of the invention are set forth with particularlity in the appended claims. The invention itself, however, both as to its organization and method of operation together with other objects and advantages thereof will be best understood from the following description of the illustrated embodiment or when read in connection with the accompanying drawings wherein like numbers have been employed in the different figures to denote the same parts and wherein:

DESCRIPTION OF THE PREFERRED EMBODIMENT

Figure 1:
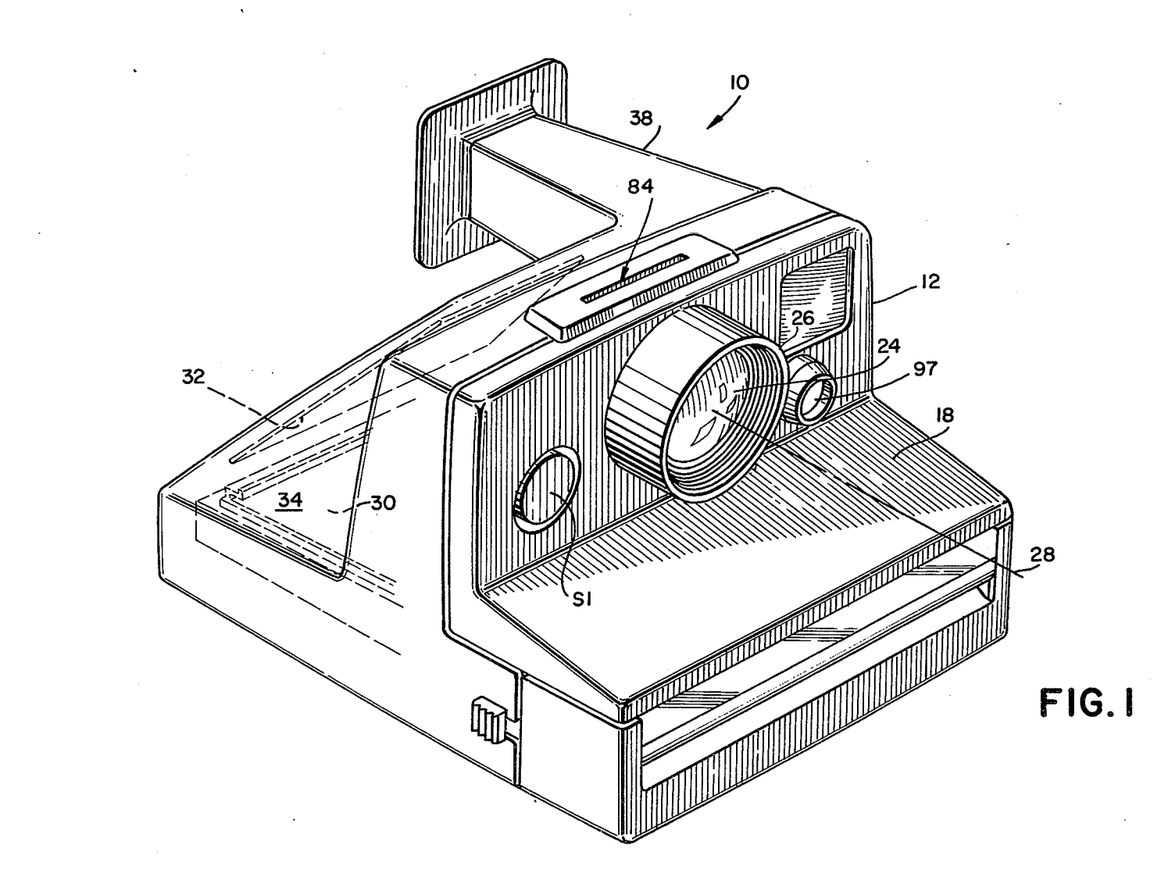
FIG. 1 is a perspective view of a camera embodying the exposure control system of this invention.
Figure 2:
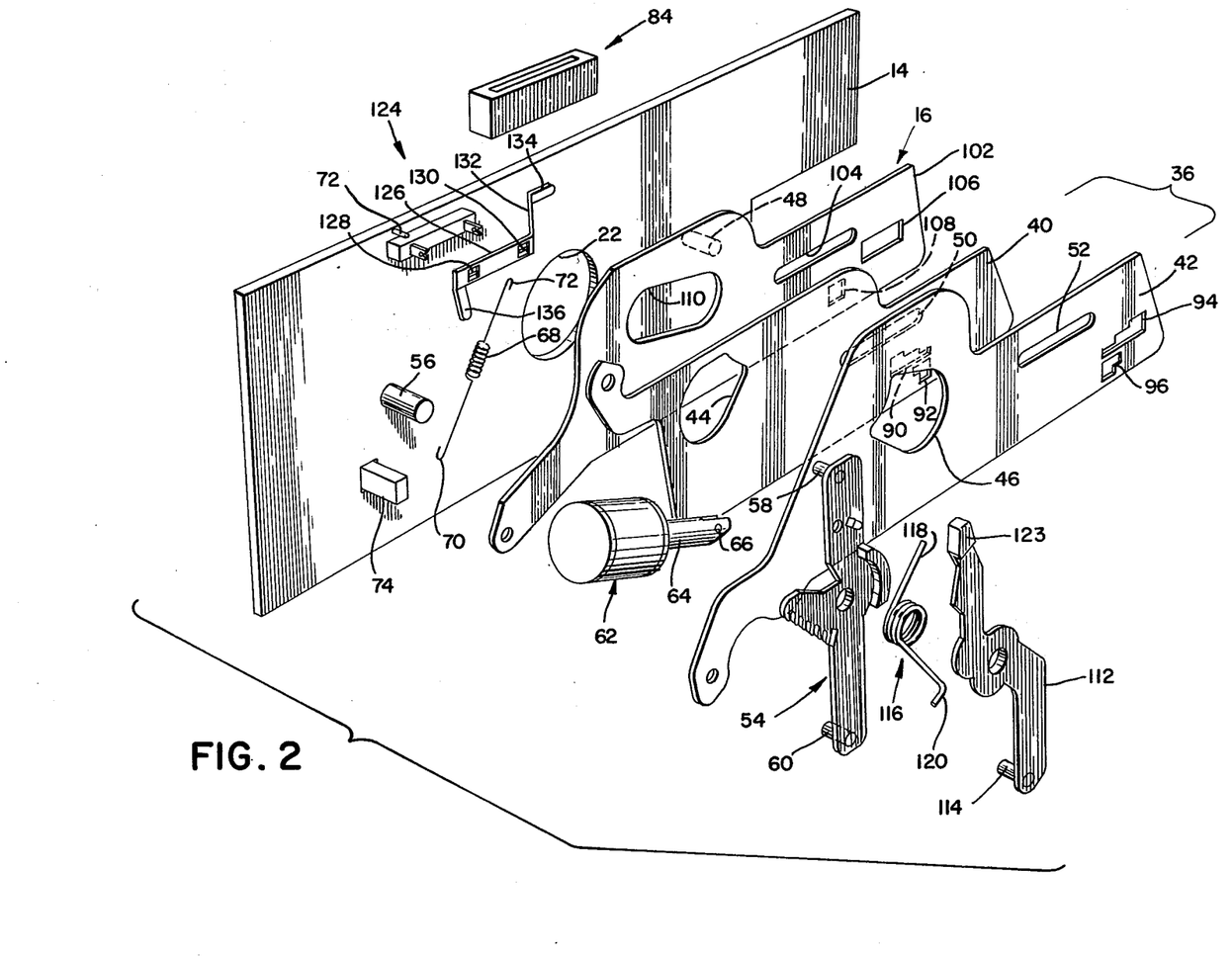
FIG. 2 is an exploded perspective view of portions of the exposure control system of this invention.

Referring now to FIGS. 1 and 2, it can be seen that the independent ambient and artificial illumination exposure control system of this invention may be associated with a photographic camera apparatus 10 contained within a housing 12. A base block casting 14 is fixedly stationed within the housing 12 and selectively machined to support the various components of the exposure control apparatus shown generally at 16. Surrounding the front and top of the base block casting 14, there is provided a cover section 18 which includes at least one opening through which extends a cylindrical lens mount 26 which is preferably of the non-variable focus type. Centrally disposed within the base block casting 14, there is provided a light entering exposure opening 22 which defines the maximum available exposure aperture for the system.

An objective or taking lens 24 is provided in overlying relation to the light entering opening 22 wherein the objective lens 24 may comprise either a single element or a plurality of elements retained in predetermined space relation by the cylindrical lens mount 26. As is readily apparent, the objective lens 24 provides a central optical axis 28 illustrated in FIG. 3 as being normal to the plane of the drawing. Thus, the objective lens 24 focuses image carrying rays through the light entering exposure opening 22 to a rearwardly positioned film or focal plane 30 by way of a reflecting mirror 32 all of which are stationed within a suitable lighttight film exposure chamber 34 within the housing 12.

Intermediate the objective lens 24 and the light entering exposure opening 22 there is supported a blade mechanism 36 comprising two overlapping shutter blade elements 40 and 42 which will be subsequently described in greater detail herein. Extending from the front cover 18 there is provided a photographic cycle initiating button $S_1$, the depression of which commences the exposure interval by ultimately effecting the release of the shutter blade elements 40 and 42. In addition, there is provided a viewfinder as shown generally at 38 which enables a photographer to properly frame and compose a desired scene to be photographed.

A pair of scene light admitting primary apertures 44 and 46 are provided respectively in the blade elements 40 and 42. Means are provided for mounting the shutter blade elements 40 and 42 for displacement along a predetermined path between a first arrangement (see FIG. 3) wherein the shutter blade elements 40 and 42 preclude scene light from reaching the film plane 30 and a second arrangement (see FIG. 4) wherein the primary apertures 44 and 46 overlap to cooperatively define a maximum size effective primary aperture to admit scene light to the film plane 30. The blade mechanism mounting means comprises a pivot pin or stud 48 projecting outward from the base block casting 14 at a location spaced laterally apart from the light entering exposure opening 22 so as to pivotally and translatably engage elongated slots 50 and 52 formed in respective shutter blade elements 40 and 42. Pin 48 may be integrally formed with the base block casting 14 and blade elements 40 and 42 may be retained in engaging relation with respect to the pin 48 by any suitable means such as peening over of the pin 48.

The means for mounting the blade mechanism additionally includes a first walking beam 54 pivotally connected to respective extended portions from each shutter blade element 40 and 42. The walking beam 54, in turn, is disposed for rotation relative to the base block casting 14 by pivotal connection to a projecting pin or stud 56 which may be integrally formed with the base block casting 14 at a location spaced laterally apart from the light entering exposure opening 22. The walking beam 54 may be pivotally retained with respect to the pin 56 by any conventional means such as an E ring (not shown). In the preferred mode, the walking beam 54 is pivotally connected at its distal ends to the shutter blade elements 40 and 42 by respective pin members 58 and 60 which extend laterally outward from the walking beam 54. Thus, clockwise rotation of the walking beam 54 operates to move shutter blade elements 40 and 42 in directions which progressively enlarge the effective primary aperture cooperatively defined by the overlapping apertures 44 and 46 over the light entering exposure opening 22 thereby defining a range of progressively increasing sized effective primary apertures for admitting scene light to the film plane 30. Such blade movement is more fully described in U.S. Pat. No. 3,924,183 entitled "Camera With Pivoting Blades" by George Whiteside issued Mar. 2, 1976. Although as is readily apparent, rotation of walking beam 54 about its pivot pin 56 effects simultaneous linear and angular displacement of shutter blade elements 40 and 42 about pivot pin 48, such angular displacement is minimal and the motion of the shutter blade elements 40 and 42 will hereinafter be described as being generally rectilinear.

Figure 3:
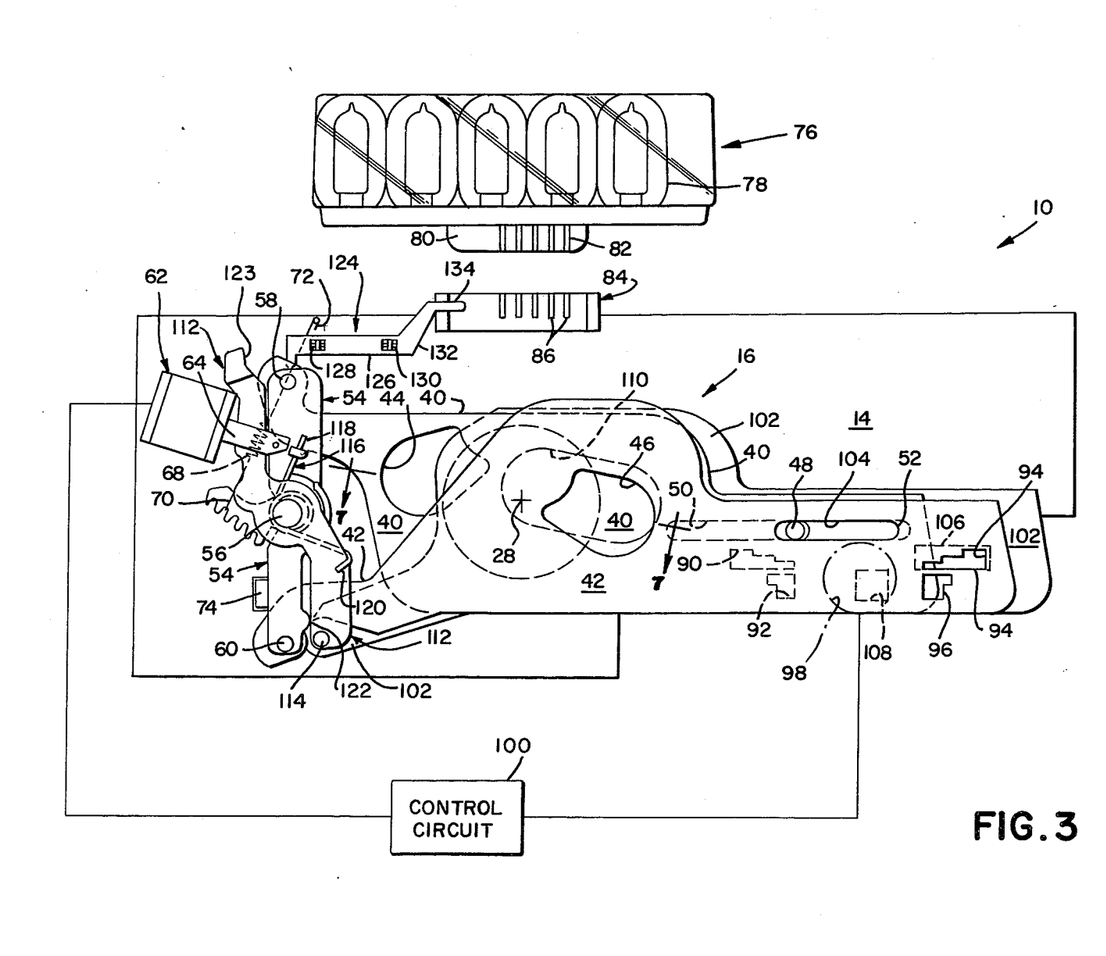
FIG. 3 is a front elevation of the exposure control system in FIG. 2 in an initial mode of its operation.
Figure 4:
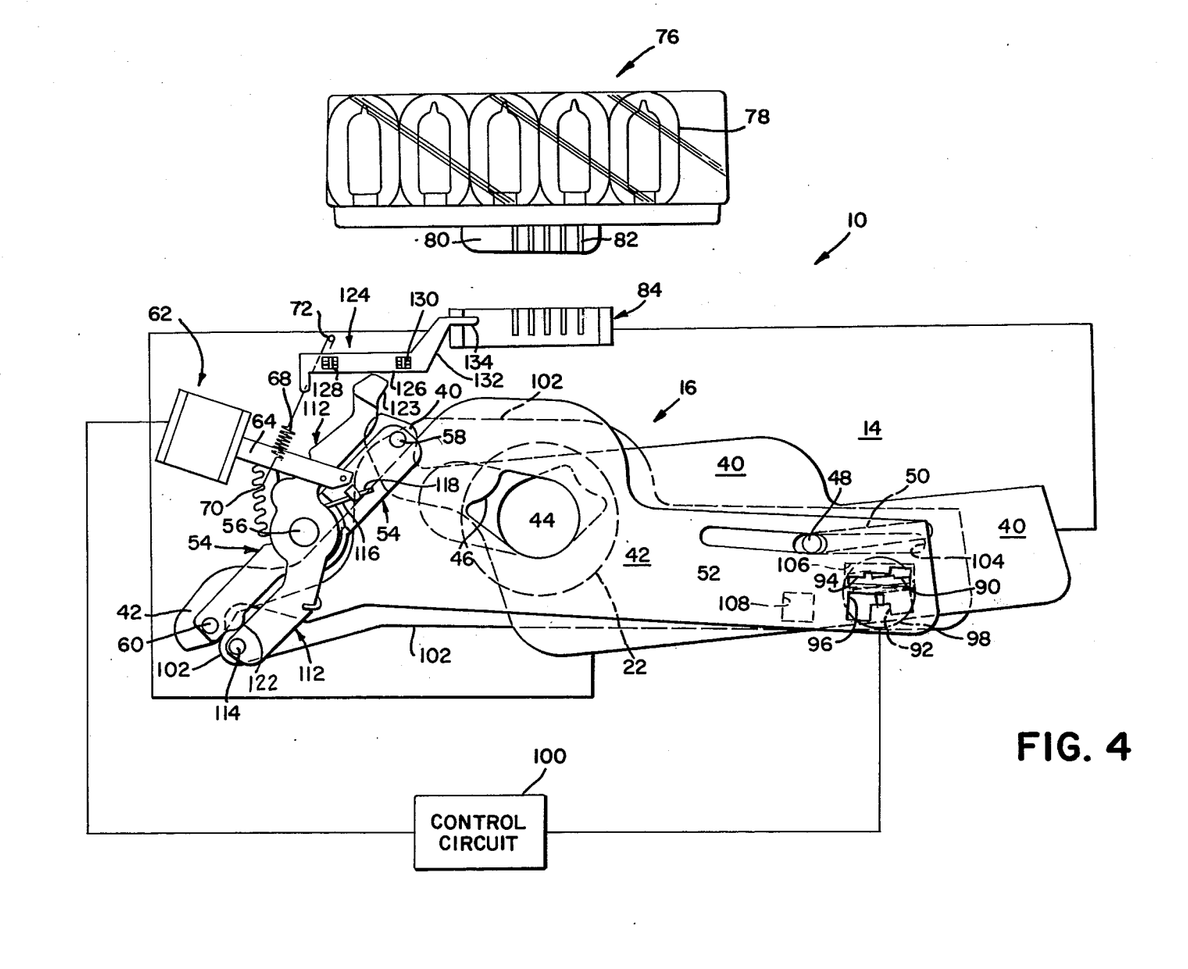
FIG. 4 is a front elevation of the exposure control system of FIG. 2 in another mode of its operation.

Selectively actuable drive means are provided for initially displacing the blade mechanism from its scene light blocking first arrangement as shown in FIG. 3 toward its scene light admitting second arrangement as shown in FIG. 4 and thereafter displacing the blade mechanism back to its initial scene light blocking first arrangement in response to the film being suitably exposed to define an exposure cycle. Such drive means comprise a tractive electromagnetic device in the form of a solenoid 62 which is employed to rotate the walking beam 54 in a counterclockwise direction thereby displacing the shutter blade elements 40 and 42 from their scene light admitting second arrangement back to their scene light blocking first arrangement. The solenoid 62 includes an internally disposed, cylindrical plunger unit 64 which retracts inwardly into the body of the solenoid upon energization of the solenoid coil or winding. The solenoid plunger 64 may be affixed to the walking beam 54 by means of a pivot pin or stud 66, such that longitudinal displacement of the plunger 64 will operate to rotate the walking beam around the pivot pin 56 so as to appropriately displace the shutter blades 40 and 42.

The selectively actuable drive means further include a biasing tension spring 68 which operates to continuously urge the walking beam 54 and its associated shutter blade elements 40 and 42 toward their scene light admitting second arrangement which defines the largest effective primary aperture over the light entry opening 22. The movable end of the tension spring 68 is attached to the walking beam 54 at 70 while the stationary end of tension spring 68 is grounded with respect to the base block casting 14 at pin 72. Thus, with the spring connection herein described, the exposure control system of this invention is biased to continuously urge the shutter blade elements 40 and 42 to move from their first scene light blocking first arrangement as shown in FIG. 3 toward their maximum effective aperture defining second arrangement as shown in FIG. 4.

In the present arrangement, the shutter blades 40 and 42 are drawn from their second arrangement back toward their first arrangement when the solenoid 62 is energized. Consequently, energization of the solenoid 62 prevents the shutter blade elements 40 and 42 from moving toward their maximum effective primary aperture defining position (second arrangement of FIG. 4) under the urging influence of spring 68. However, as should be readily understood, the exposure control system of this invention will be equally applicable to photographic systems where the blades 40 and 42 are spring biased in a normally closed position.

Continued energization of the solenoid 62 in order to maintain the shutter blade elements 40 and 42 in their closed position (first arrangement of FIG. 3) may result in an undesirable drain in the camera apparatus power source which preferably is an electrical storage battery housed within the film cassette in a well known manner. Thus, a mechanical latch as shown generally at 74 in FIG. 3 may be provided to move into lateral engagement with an edge of the walking beam 54 so as to maintain the blade elements 40 and 42 in their closed first arrangement regardless of the energization of solenoid 62. Additional information regarding the structure and operation of the latch 74 is described in an application for U.S. Pat. Ser. No. 554,777 entitled "Photographic Apparatus With Sequencing System" by B. K. Johnson, D. Van Allen, and G. D. Whiteside filed Mar. 3, 1975 in common assignment herewith.

The photographic camera apparatus 10 may be used in artificial scene lighted mode of operation by connecting a source of artificial illumination which preferably comprises a linear array of flash lamps as shown generally at 76. The linear flash array includes a plurality of individually spaced apart flash lamps 78 which respectively connect to a plurality of spaced apart terminal pads or elements 82 disposed on a connecting blade 80. The linear flash array 76 may be releasably connected with respect to the camera housing 12 by way of a receiving socket 84 which also includes a plurality of spaced apart terminal pads or elements 86. A linear flash array 76 may be inserted and withdrawn from the receiving socket 84 in a manner as is fully described in U.S. Pat. No. 3,757,643 entitled "Photoflash Apparatus" by John Burgarella issued Sept. 11, 1973 and assigned in common herewith.

Means are cooperatively associated with the blade mechanism and its mounting means for detecting scene light during an exposure cycle. Such scene light detecting means comprise a first pair of spaced apart photocell sweep secondary apertures 90 and 92 on blade element 40 together with a second pair of spaced apart photocell sweep secondary apertures 94 and 96 on blade element 42. The aforementioned photocell sweep secondary apertures 90, 92, 94 and 96 are aligned to transmit scene light received from a second opening 97 in the cover section 18 of housing 12 in a manner to be subsequently described in greater detail herein. A photoresponsive element 98 is stationed behind the photocell sweep secondary apertures and positioned to receive scene light transmitted by the photocell sweep secondary apertures. The photoresponsive element 98 may be a photovoltaic cell of the type generating an output signal in correspondence with the levels of scene light intensity incident thereon. There may, in addition, be positioned a prism (not shown) in optical alignment with the photoresponsive element 98 to provide an upward directional bias to the photoresponsive element 98 in a known manner as is generally desirable in the artificially scene lighted mode of operation. The photoresponsive element 98 is coupled to a light integrating and control circuit 100 which may include an operational amplifier having a feed back path comprising an integrating capacitor connected in a well known manner for providing a linear output signal corresponding to the time integration of scene light intensity incident to the photoresponsive element 98. The light integrating and control circuit 100 in turn is connected to the solenoid 62 in order to energize the solenoid in correspondence to the film recieving sufficient scene light corresponding to a select exposure value.

The aforementioned means for detecting scene light further comprise a capping blade 102 having an elongated primary aperture 110 therethrough in overlapping relation to the light entering exposure opening 22 together with a spaced apart ambient scene light admitting secondary aperture 106 and an artificial scene light admitting secondary aperture 108. Means are included for mounting the capping blade 102 in overlapping relation with respect to the shutter blade elements 40 and 42 for selective actuable movement in correspondence with the shutter blade elements 40 and 42. Such means for mounting the capping blade 102 comprise an elongated slot 104 which is pivotally and translatably engaged by the pivot pin 48 in the aforementioned manner. The means for mounting the capping blade 102 additionally include a second walking beam 112 pivotally connected at one of its distal ends by a pin 114 to the capping blade 102. The walking beam 112 is additionally disposed for substantially coaxial pivotal movement with respect to the first walking beam so as to impart a generally rectilinear translation to the capping blade 102 in the same general direction as the shutter blade element 42. Means in the form of a torsion spring 116 are additionally provided for biasing the second walking beam 112 with respect to the first walking beam 54 so that clockwise pivotal movement of the first walking beam 54 from its scene light unblocking first arrangement as shown in FIG. 3 toward its scene admitting second arrangement as shown in FIG. 4 will be imparted to the second walking beam 112. In this manner, the capping blade 102 will move in correspondence with the blade element 42 moving from its light blocking first arrangement toward its scene light admitting second arrangement. The torsion spring 116 is connected at one end 118 to the first walking beam 54 and at the other end 120 to the second walking beam 112.

The edge of the second walking beam 112 is also engagable by the edge of the first walking beam 54 at a point as shown generally at 122 so that pivotal movement of the first walking beam 54 in a counter clockwise direction will be imparted to the second walking beam 112 in order to move the capping blade 102 in correspondence with the blade element 42 moving from its scene light admitting second arrangement back toward its scene light blocking first arrangement.

The other end of the walking beam 112 defines an abutment surface 123 at its distal end for cooperation with means for actuating the aforementioned scene light detecting means to detect scene light in the artificially scene lighted mode in response to the connection of the flash array 76 to the camera in a manner to be subsequently described. Such actuating means comprises an actuating assembly 124 having a longitudinal drive link 126 disposed for rotation relative to the base block casting 14 by a pair of spaced apart integral pins 128 and 130 extending from the longitudinal drive link 126 in respective journalled relation with a pair of appropriate bearing surfaces extending from the base block 14. As will be readily appreciated, the longitudinal drive link 126 is preferably disposed for rotation about an axis parallel to the plane of shutter blade element 40 and 42 movement although the axis may also be slightly skewed with regard to the shutter blade element plane of movement without effecting the operation of the actuation assembly 124.

The longitudinal drive link 126 additionally includes an integral arm portion 132 extending upwardly therefrom and defining a tip portion 134 extending into the area of the linear flash array receiving socket 84. The longitudinal drive link 126 additionally defines an integral stop arm portion 136 at the opposite end thereof for rotation into the locus of travel of the walking beam abutment surface 123 for reasons which will become apparent from the following discussion. A biasing spring element (not shown) is additionally provided to rotationally bias the drive link 126 to rotate its integral stop arm portion 136 out of the locus of travel of the walking beam abutment surface 123 while simultaneously rotating the tip portion 134 into the socket 84 in potential engaging relation with respect to the connecting blade 80 of a linear flash array 76 inserted into socket 84.

Figure 7:
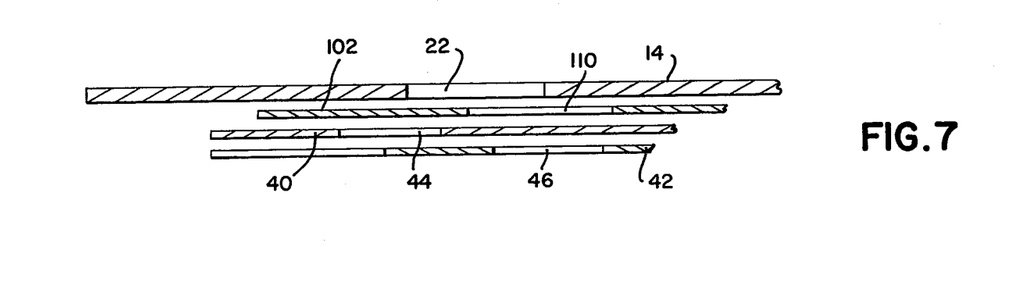
FIG. 7 is a cross-sectional view taken across the lines 7—7 in FIG. 3.

With the shutter blade elements 40 and 42 and their associated capping blade 102 in their scene light blocking first arrangement as shown in FIG. 3 it will be readily appreciated by referring to the cross-sectional view of FIG. 7 that the capping blade 102 operates in conjunction with the shutter blade element 42 to provide a labyrinth type light proof seal about the primary apertures 44, 46 in a manner as is more fully disclosed in U.S. Pat. No. 3,532,046 entitled "Photographic Shutter" issued Oct. 6, 1975.

Operation of the photographic apparatus 10 in the ambient scene lighted mode may commence upon depression of the photographic cycle initiating button $S_1$ which operates to laterally displace the mechanical latch 74 out of engagement with the edge of the walking beam 54 in the aforementioned manner. The walking beam 54 is thereafter rotated in a clockwise direction as viewed from FIG. 3 by the drive spring 68 to move the shutter blade elements 40 and 42 in opposing directions so that the primary apertures 44 and 46 overlap to cooperatively define a range of progressively increasing sized effective primary apertures for admitting scene light to the film plane 30 as the blades move from their scene light blocking first arrangement to their scene light admitting second arrangement. As is now readily apparent, the second walking beam 112 is also rotated in a clockwise direction by the torsion spring 116 so as to move the capping blade 102 in correspondence with the shutter blade element 42. The elongated primary aperture 110 of the capping blade 102 overlaps the effective primary aperture cooperatively defined by the overlapping apertures 44 and 46 so as to admit scene light to the rearwardly positioned film plane 30. In addition, the ambient scene light admitting secondary aperture 106 of the capping blade 102 moves into overlapping relation with the effective photocell sweep secondary aperture cooperatively defined by the overlapping secondary apertures 90 and 94 so as to admit scene light to the photoresponsive element 98. At the same time, the artificial scene light admitting secondary aperture 108 of the capping blade 102 moves out of overlapping relationship with respect to the effective photocell sweep secondary aperture cooperatively defined by the overlapping secondary apertures 92 and 96 so as to block any scene light which might otherwise be admitted to the photoresponsive element 98 from that effective photocell sweep secondary aperture defined by the overlapping apertures 92 and 96.

Thus, the secondary apertures 90 and 94 overlap to cooperatively control the admittance of scene light to the photoresponsive element 98 through a second range of progressively increasing sized apertures in a manner maintaining a first select corresponding relationship between the detected scene light and the scene light admitted to the focal plane 30 by the shutter blade elements 40 and 42 as the shutter blades move through their range of progressively increasing sized apertures.

Figure 8:
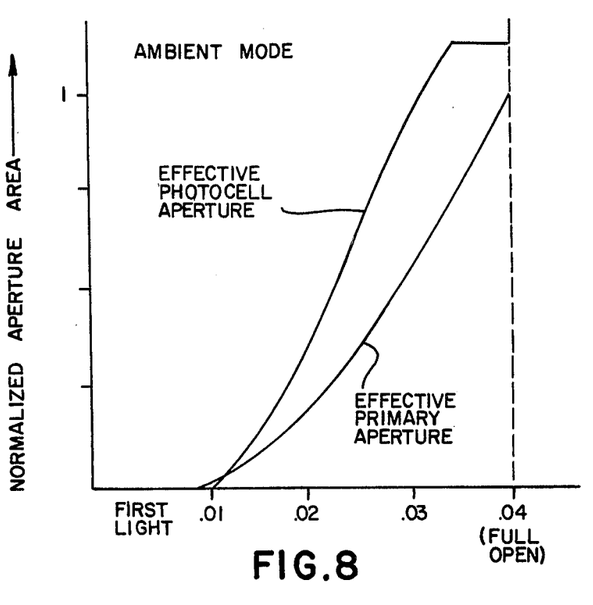
FIG. 8 is a graph showing the normalized range of aperture areas during an exposure cycle in the ambient scene lighted mode of operation.

This select corresponding relationship maintained between the detected scene light and the film exposing scene light may be better understood by referring to the graph of FIG. 8 wherein the variations in the normalized areas for the range of effective primary apertures defined by the overlapping apertures 44 and 46 and the variation in the normalized areas for the range of effective photocell sweep secondary apertures defined by the overlapping apertures 90 and 94 are plotted as a function of the time required for the shutter blade elements 40 and 42 to move from their scene light blocking first arrangement to their scene light unblocking second arrangement. As is readily apparent, the normalized area for the effective photocell sweep secondary aperture increases ahead of the normalized area for the effective primary aperture in order to anticipate for the scene light admitted to the film plane 30 during the finite time required for the shutter blade elements 40 and 42 to return from their scene light admitting second arrangement back to their scene light blocking first arrangement in a well known manner.

When sufficient scene light has been admitted to the film plane 30 to effect a select exposure value, the scene light integrating and control circuit 100 provides an output signal to energize the solenoid 62 thereby rotating the walking beam 54 in a counterclockwise direction so as to return the shutter blade elements 40 and 42 back to their scene light blocking first arrangement. As is readily apparent, counterclockwise direction of walking beam 54 operates to bring walking beam 54 into engagement with the edge of walking beam 112 so as to rotate walking beam 112 in a counterclockwise direction back to its initial position.

In this manner, the capping blade 102 is moved in direct correspondence with the shutter blade element 42. The capping blade serves to block the admittance of scene light through the photocell sweep secondary apertures 92 and 96 while accommodating the admittance of scene light through the photocell sweep secondary apertures 90 and 94 to the photoresponsive element 98. The photocell sweep secondary apertures 90 and 94 may thus be specially configured to maintain a select corresponding relationship between the detected scene light and the scene light admitted to the focal plane 30 by the blade mechanism as is especially suited for the ambient scene lighted mode of operation.

Figure 5:
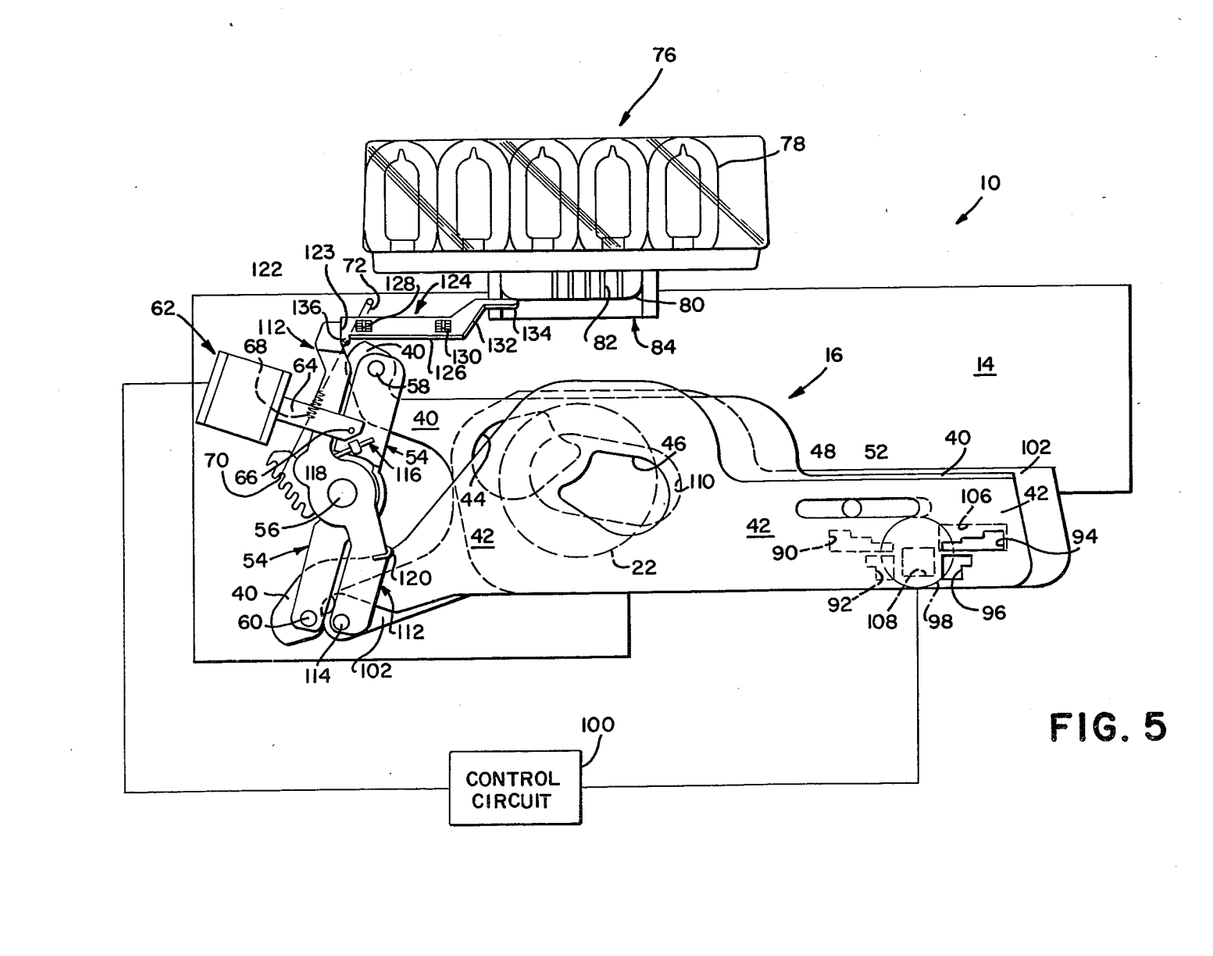
FIG. 5 is a front elevation of the exposure control system of FIG. 2 in still another mode of its operation.
Figure 6:
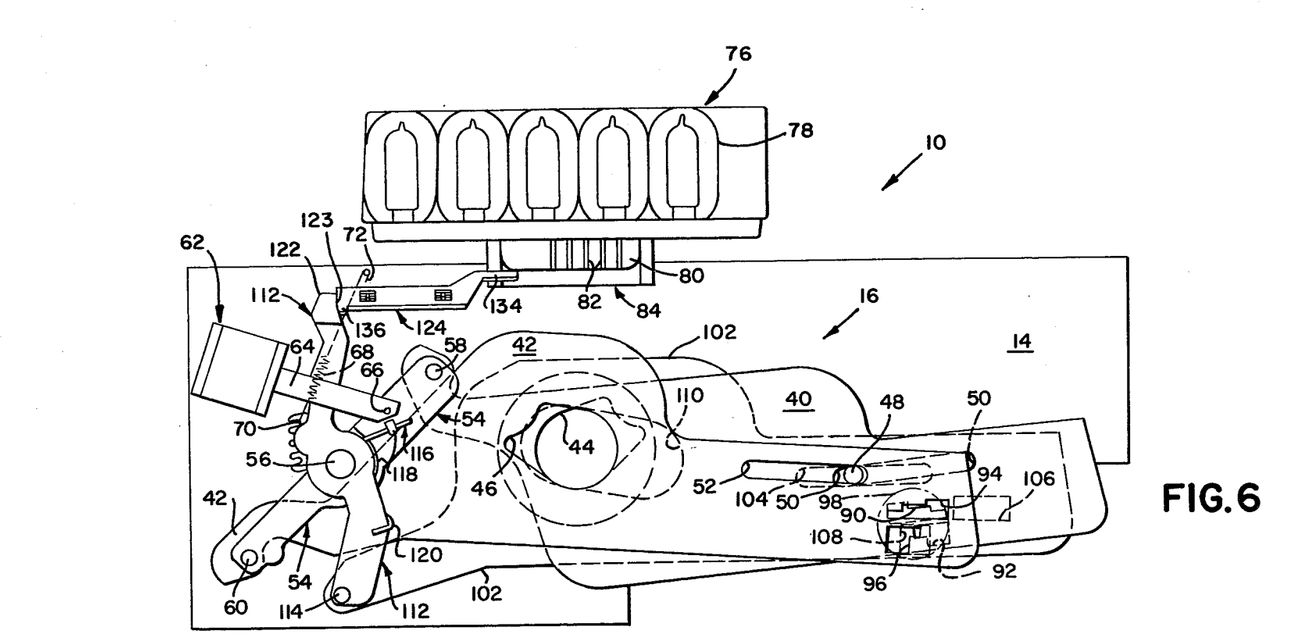
FIG. 6 is a front elevation of the exposure control system of FIG. 2 in still another mode of its operation.

Referring now to FIGS. 5 and 6, it can be seen that the artificial scene lighted mode of operation is initiated by first inserting the connecting blade 80 of the linear flash array 76 into the socket 84 in a well known manner. The connecting blade 80, in turn, engages the tip portion 134 of the longitudinal drive link 126 so as to rotate the drive link 126 about its longitudinal axis thereby rotating the integral stop arm 136 into the locus of travel of the abutment surface 123 of the walking beam 112.

The artificial scene lighted exposure cycle is initiated in the aforementioned manner by depressing the button S₁ which in turn displaces the mechanical latch 74 out of engagement with the edge of the walking beam 54 so as to permit the walking beam 54 to be rotated in a clockwise direction by its drive spring 68 thereby moving the shutter blade elements 40 and 42 from their scene light blocking first arrangement to their scene light admitting second arrangement. The walking beam 112 is rotated in correspondence with the walking beam 54 by the torsion spring 116 until the abutment surface 123 is engaged by the integral stop arm 136, (see FIG. 6) after which the torsion spring 116 becomes further tightened by the continued clockwise rotation of the walking beam 54. In this manner, the capping blade 102 is inhibited from moving in correspondence with the shutter blade element 42 and thus operates by virtue of the lower aperture 108 to allow scene light admitted by the effective photocell sweep secondary aperture defined by the overlapping apertures 92 and 96 to be admitted to the photoresponsive element 98. The capping blade 102 additionally operates to simultaneously block the scene light admitted by the effective photocell sweep secondary aperture defined by the overlapping apertures 90 and 94.

Figure 9:
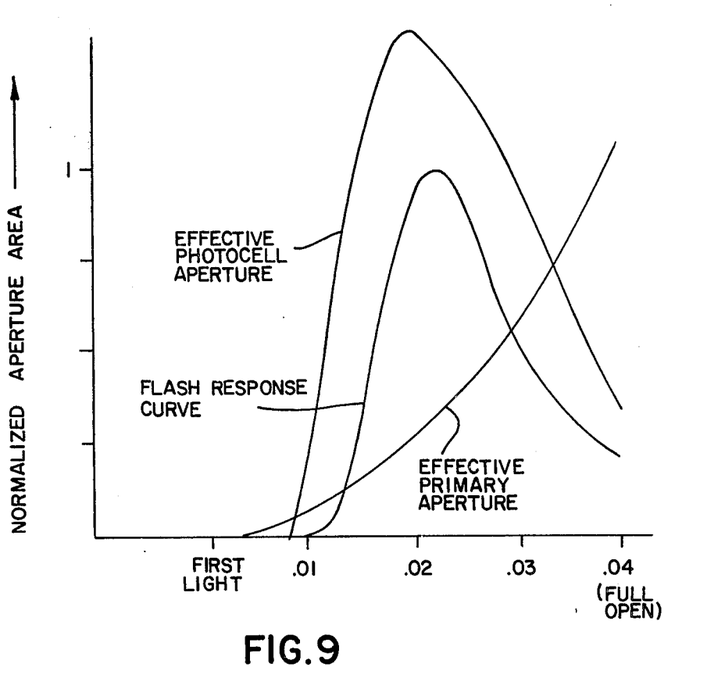
FIG. 9 is a graph showing the normalized range of areas for the apertures during the artificial scene lighted mode of operation.

Thus, by configuring the photocell sweep secondary apertures 92 and 96 in a special manner, a second select corresponding relationship can be maintained between the detected scene light and the scene light admitted to the focal plane 30 by the blade mechanism as it moves through its range of apertures in the artifical scene lighted mode of operation. This second corresponding relationship may be better understood by referring to the graph of FIG. 9 wherein the normalized areas for the range of effective photocell sweep secondary apertures defined by the overlapping apertures 92 and 96 and the range of effective scene light admitting primary apertures defined by th overlapping apertures 44 and 46 are plotted as a function of the time required for the shutter blade elements 40 and 42 to move from their scene light blocking first arrangement to their scene light unblocking second arrangement. At a select instant after the shutter blade elements move from their scene light blocking first arrangement, a flash lamp 78 of the linear flash array 76 is fired in a well known manner as is more fully described in U.S. Pat. No. 4,040,069, entitled "Fixed Time Delay Circuit For Quench Strobe" by W. Pope et al. issued Aug. 2, 1977. The flash lamp output response has been superimposed with respect to the normalized area curves for the effective primary and secondary apertures to better illustrate the corresponding relationship between the range of effective photocell sweep secondary apertures as defined by the overlapping apertures 92 and 96 and the flash lamp output response. Thus, it can be seen that an entirely different corresponding relationship can be maintained between the detected scene light and the scene light admitted to the focal plane 30 for the artificially scene lighted mode of operation than for the ambient scene light mode of operation. In addition, since the effective photocell sweep secondary aperture defined by the overlapping apertures 92 and 96 is below the effective photocell sweep secondary aperture defined by the overlapping apertures 90 and 94 when the photographic apparatus is held in its normal upright position, there may be achieved a raising of the general field of view for the photoresponsive element 98 as is particularly desirable for the artificial scene lighted mode of operation.

In like manner to the aforementioned ambient scene lighted mode of operation, the light integrating and control circuit 100 provides an output signal to energize the solenoid 62 to drive the shutter blade elements 40 and 42 back to their scene light blocking first arrangement in response to a select amount of scene light being admitted to the film plane 30 to effect the desired exposure. As will be readily appreciated, during the artificial scene lighted mode of operation, the walking beam 112 is rotated through a limited degree of rotation until the abutment surface 123 engages the stop arm 136 in order to move the leading edge of the ambient scene light admitting aperture 110 out of scene light blocking relation with respect to the effective scene light admitting primary apertures defined by the overlapping apertures 44 and 46 as the blade mechanism moves between its first and second arrangements. Thus, regardless of whether the capping blade 102 moves in correspondence with the shutter blade element 42 as during the ambient scene lighted mode of operation or remains in fixed position against the actuating assembly 124 as during the artificial scene lighted mode of operation, the elongated ambient scene lighted admitting aperture 110 will still unblock the scene light entering exposure opening in the base block 14.

The exposure control system of this invention provides a means by which the corresponding relationship between the detected scene light and the scene light admitted to the focal plane 30 by the blade mechanism may be especially tailored for either the ambient scene lighted mode of operation or the artifically scene lighted mode of operation using only a single photocell. In addition, the effective photocell sweep secondary apertures in cooperation with the aforementioned prism operate to bias the directional response of the photoresponsive element downward during the ambient scene lighted mode of operation. This downward directed exposure weighting in the ambient scene lighted mode is useful in many photographic applications, for example, where the sky forms the background for a scene. In the artificial scene lighted mode of operation, the exposure control system provides upward exposure weighting to accommodate typical flash requirements.

This invention may be embodied in other specific forms, such as cameras having variable focus objective lenses without departing from the spirit or essential characteristics thereof. The present embodiments are therefor to be considered in all respects as illustrative and not restrictive, the scope of the invention being indicated by the appended claims rather than the foregoing description, and all changes which come within the meaning and range of the claims are therefore intended to be embraced therein.

What is claimed is:

1. A photographic camera apparatus for use in either an ambient scene lighted mode or an artificially scene lighted mode wherein the camera includes means for mounting photographic film material at a given focal plane, said camera comprising:

a blade mechanism;

means for mounting said blade mechanism for displacement between a first arrangement wherein it precludes scene light from reaching the film plane and a second arrangement wherein it defines a maximum size aperture, said blade mechanism serving to define a first range of progressively increasing sized apertures for admitting scene light to the film plane as it moves from its said first arrangement to its said second arrangement;

selectively actuable means cooperatively associated with said blade mechanism and said mounting means for alternately detecting scene light during the ambient scene lighted mode in a manner maintaining a first select corresponding relationship between the detected scene light and the scene light admitted to the focal plane by said blade mechanism as it moves through said range of apertures between said first and second arrangements, and for detecting scene light during the artificially scene lighted mode in a manner maintaining a second select corresponding relationship between the detected scene light and the scene light admitted to the focal plane by said blade mechanism as it moves through said range of apertures between said first and second arrangements;

means for integrating said detected scene light to provide an output signal corresponding to a select exposure value; and selectively actuable drive means for initially displacing said blade mechanism from its said first arrangement toward its said second arrangement, and for thereafter displacing said blade mechanism back toward its said first arrangement in response to said output signal from said scene light integrating means to define an exposure cycle.

2. The photographic camera apparatus of claim 1 wherein said camera apparatus is adapted to releasably connect to a source of artificial illumination and means and included for actuating said scene light detecting means to detect scene light in said artificially scene lighted mode in response to the connection of the source of artificial illumination to said camera apparatus.

3. The photographic apparatus of claim 1 wherein: said blade mechanism includes two overlapping shutter blade elements each having a respective primary aperture therethrough, said primary apertures being cooperatively arranged to define said range of progressively increasing sized apertures; and said scene light detecting means includes a photoresponsive element, and a pair of spaced apart secondary apertures in each of said overlapping blade elements wherein a first one of said secondary apertures in one of said blade elements cooperates with a first one of said secondary apertures in the other of said blade elements to define a second range of progressively changing sized apertures for admitting scene light to said photoresponsive element as said blade elements move between said first and second arrangements, said first ones of said secondary apertures being cooperatively configured to provide said first select corresponding relationship between the detected sceen light and the scene light admitted to the focal plane, and wherein a second of said secondary apertures in said one of said blade elements cooperates with a second of said secondary apertures in said other of said blade elements to define a third range of progressively changing sized apertures for admitting scene light to said photoresponsive element as said blade elements move between said first and second arrangements, said second apertures being cooperatively configured to provide said second select corresponding relationship between the detected scene light and the scene light admitted to the focal plane.

4. The photographic apparatus of claim 3 wherein said first ones of said secondary apertures are generally above said second ones of said secondary apertures when said photographic apparatus is in a normal upright position in order that the field of view for said photoresponsive element during said ambient mode of operation be lowered with respect to the field of view for said photoresponsive element during said artificially scene lighted mode.

5. The photographic apparatus of claim 3 wherein said scene light detecting means also includes a capping blade together with means for mounting said capping blade in overlapping relation with respect to at least a portion of said blade mechanism for selectively actuable movement between at least two arrangements, said capping blade operating when in one of its said arrangements to block the admittance of scene light to said photoresponsive element from said third range of apertures while permitting the admittance of scene light to said photoresponsive element from said second range of apertures while permitting the admittance of scene light to said photoresponsive element from said second range of apertures, said capping blade also operating when in the other of its said arrangements to block the admittance of scene light to said photoresponsive element from said third range of apertures.

6. The photographic apparatus of claim 5 wherein said capping blade operates in conjunction with said blade mechanism to provide a labyrinth light seal about said primary aperture when said blade mechanism is in its scene light blocking first arrangement.

7. The photographic apparatus of claim 3 wherein said scene light detecting means also includes a capping blade together with means for mounting said capping blade in overlapping relation with respect to said blade mechanism for selectively actuable movement in correspondence with said blade mechanism, said capping blade being configured such that upon its selective movement in correspondence with said blade mechanism, said capping blade operates to block the admittance of scene light to said photoresponsive element from said third range of apertures while permitting the admittance of scene light to said photoresponsive element from said second range of apertures, said capping blade being further configured such that upon its selective actuation not to move in correspondence with said blade mechanism, said capping blade operates to block the admittance of scene light to said photoresponsive element from said second range of apertures while permitting the admittance of scene light to said photoresponsive element from said third range of apertures.

8. The photographic apparatus of claim 7 wherein said camera apparatus is adapted to releasably connect to a source of artificial illumination and means are included for inhibiting movement of said capping blade in correspondence with said blade mechanism in response to the connection of the source of artificial illumination to said camera apparatus.

9. The photographic apparatus of claim 7 wherein: said means for mounting said overlapping blade elements includes a first walking beam pivotally connected at each distal end to a respective blade element and disposed for pivotal movement with respect to said camera apparatus so as to impart generally rectilinear translation in opposing directions to each of said blade elements; and said means for mounting said capping blade element includes a second walking beam pivotally connected at one distal end to said capping blade and disposed for substantial coaxial pivotal movement with respect to said first walking beam so as to impart a generally rectilinear translation to said capping blade in the same general direction as a one of said blade elements, said capping blade mounting means additionally including means for biasing said second walking beam with respect to said first walking beam in order that pivotal movement of said first walking beam in one direction be imparted to said second walking beam to move said capping blade in correspondence with said one blade element moving from its said first arrangement to its said second arrangement, said second walking beam also being engagable by said first walking beam in order that pivotal movement of said first walking beam in the direction opposite to said one direction be imparted to said second walking beam to move said capping blade in correspondence with said one blade element moving from its said second arrangement back to its said first arrangement.

10. The photographic camera apparatus of claim 9 wherein there are further included selectively actuable means for engaging said second walking beam to inhibit the rotation thereof under the operative influence of said biasing means upon the rotation of said first walking beam.

* * * * *